(12) United States Patent
Kim et al.

(10) Patent No.: US 12,367,296 B2
(45) Date of Patent: Jul. 22, 2025

(54) NATIVE MULTI-TENANT ROW TABLE ENCRYPTION

(71) Applicant: SAP SE, Walldorf (DE)

(72) Inventors: Beomsoo Kim, Seoul (KR); Yong Sik Kwon, Seoul (KR); Ji Hoon Jang, Seoul (KR); Hyeong Seog Kim, Seoul (KR)

(73) Assignee: SAP SE, Walldorf (DE)

( * ) Notice: Subject to any disclaimer, the term of this patent is extended or adjusted under 35 U.S.C. 154(b) by 377 days.

(21) Appl. No.: 17/988,975

(22) Filed: Nov. 17, 2022

(65) Prior Publication Data

US 2024/0169072 A1 May 23, 2024

(51) Int. Cl.
*G06F 21/60* (2013.01)
*G06F 21/62* (2013.01)
(52) U.S. Cl.
CPC ........ *G06F 21/602* (2013.01); *G06F 21/6218* (2013.01)
(58) Field of Classification Search
CPC ........................... G06F 21/602; G06F 21/6218
USPC ....................................................... 713/193
See application file for complete search history.

(56) References Cited

U.S. PATENT DOCUMENTS

2009/0214044 A1 8/2009 Kinoshita
2022/0207173 A1* 6/2022 Mwaura .............. G06F 16/2379

FOREIGN PATENT DOCUMENTS

CN 105787057 A 7/2016

OTHER PUBLICATIONS

Communication: "Extended European Search Report", Mar. 1, 2024 (Mar. 1, 2024), European Patent Office, for European Application No. 23180795.9-1203, 9 pages.

* cited by examiner

*Primary Examiner* — Vivek Srivastava
*Assistant Examiner* — Hien V Doan
(74) *Attorney, Agent, or Firm* — Buckley, Maschoff & Talwalkar LLC

(57) ABSTRACT

Systems and methods include determination of a first encryption key associated with a data page of a row store database table stored in a volatile memory, based on a header of the data page, encryption of a body of the data page using the first encryption key, and storage of an encrypted data page comprising the header and the encrypted body in a persistent storage system.

12 Claims, 9 Drawing Sheets

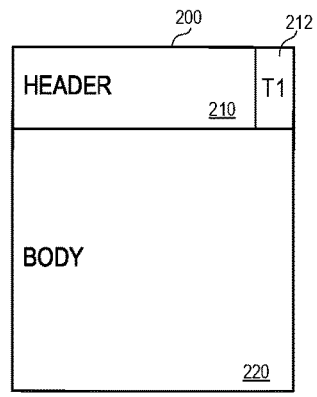
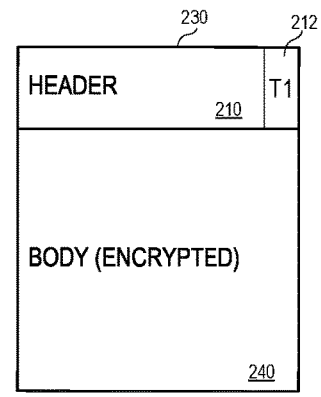
FIG. 2A  FIG. 2B
FIG. 3A  FIG. 3B

NATIVE MULTI-TENANT ROW TABLE ENCRYPTION

BACKGROUND

Multi-tenancy is a software architecture pattern which facilitates the sharing of computing resources among disparate groups of users. For example, a single multi-tenant application (e.g., a Software-as-a-Service (SaaS) application) may serve multiple end user groups (i.e., customers) within a single software instance. Such a software instance uses a much smaller computing resource footprint than would be required to provision one software instance per customer. Multi-tenancy can therefore provide substantial cost benefits.

The data of each customer in a multi-tenant architecture is typically mapped to a corresponding tenant in the underlying data layer. This mapping allows for logical separation of the data within the data layer and facilitates access thereto by the multi-tenant application. In some multi-tenant architectures, the data of each tenant is managed by a different database instance executing within a same computing system (e.g., a rack server). These architectures provide excellent separation of tenant data but it may be cost-inefficient in some scenarios to require a full database instance per tenant. For example, a smallest database instance may consume 32Gb of memory, which may represent significantly more computing resources than should be required by a small tenant.

Other multi-tenant data architectures use a single database instance to manage the data of multiple tenants. Since the data in such an architecture is not physically separated, the multi-tenant application is responsible for storing and managing the data in a tenant-aware manner. For example, a database system may use one schema of a single instance for all tenants, where the data of each tenant is partitioned via a discriminating column. The multi-tenant application uses the values of the discriminating column to identify the data belonging to specific tenants. In another example, the multi-tenant application associates a dedicated schema to each tenant. In either case, the database system is unaware of the existence of the multiple tenants and operates in the same manner as if it were being accessed by a single-tenant application.

Data volumes and log segments of a database system may be persisted to disk. This data, which includes all the customer (i.e., tenant) data stored in the database system as well as data and metadata not specific to any customer, is conventionally encrypted using a key associated with the database system (i.e., a data encryption key) prior to storage thereof on disk. The data encryption key is generated by a provider of the database system and its corresponding decryption key is stored local to the database.

Systems are desired which facilitate the provision of such database-instance-level encryption features on a tenant-level.

BRIEF DESCRIPTION OF THE DRAWINGS

FIG. 2A illustrates an unencrypted data page including a tenant-identifying header portion according to some embodiments.

FIG. 2B illustrates an encrypted data page including a key-identifying header portion according to some embodiments.

FIG. 3A illustrates unencrypted redo log entries including a key-identifying header portion according to some embodiments.

FIG. 3B illustrates an encrypted redo log entries including a key-identifying header portion according to some embodiments.

DETAILED DESCRIPTION

Figure 1:
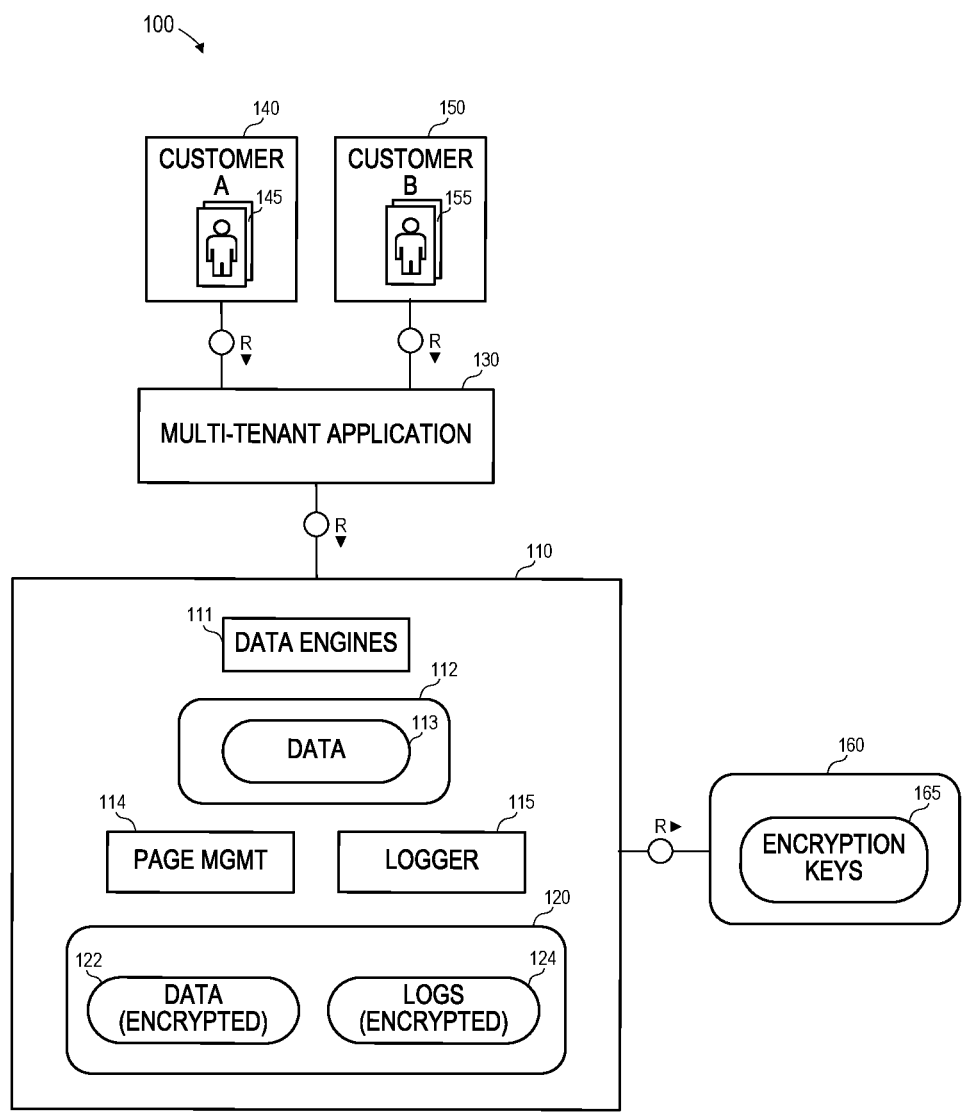
FIG. 1 is a block diagram of a database system providing native multi-tenant row table encryption according to some embodiments.

The following description is provided to enable any person in the art to make and use the described embodiments. Various modifications, however, will be readily-apparent to those in the art.

Generally, all database system data not actively being processed (i.e., data "at rest") resides encrypted in persistent storage, where the data of each database tenant is encrypted with its own tenant-specific key. Data and metadata which is shared by all tenants (e.g., database catalog, users, shared containers) may be encrypted in persistent storage using a database instance-specific key.

Such encryption may prevent data leakage and provide defense in case of a third-party breach. The keys may be customer-supplied and controlled (e.g., revoked) to prevent access to customer data by the database provider. In a multi-tenant scenario, where the database system may include data of two or more customers, revocation of a key by a particular customer should only render the data of that particular customer inaccessible. Such customer control may decrease potential liability of the database provider if confidential customer data becomes public and the source of data leakage cannot be identified.

Embodiments facilitate encryption of tenant-specific data and logs using tenant-specific encryption keys prior to persistent storage of the encrypted data, and decryption of persistently-stored encrypted tenant-specific data and logs using tenant-specific decryption keys prior to loading of the decrypted data into volatile memory. According to some embodiments, the header of each data page of a row store database table includes an identifier of a tenant with which the row store database table is associated. Prior to storing the data page in persistent storage, the identifier is used to determine an encryption key and the encryption key is used to encrypt the body (and not the header) of the data page. The data page, consisting of an unencrypted header and an encrypted body, is then stored in the persistent storage.

Conversely, in order to load the data page from persistent storage into memory, for example, at a database restart, the header of the stored data page is read to determine a corresponding decryption key. The decryption key is used to decrypt the body of the data page. The data page, now consisting of the header and the unencrypted body, may then be loaded into memory.

According to some embodiments, a native multi-tenant database system includes a database-level tenant object (e.g., a database catalog object) which facilitates the implementation of multi-tenant architectures on the application layer. A tenant object is a logical collection of data as well as metadata artifacts which have been assigned to a tenant. Tenants may be exposed as first-class database objects (i.e., having an identity independent of any other database entity).

The database artifacts assigned to a particular instantiation of a tenant object (i.e., a particular tenant) may include, but are not limited to, data of one or more schemas, tables, and partitions, as well as metadata defining views on the tenant's tables, virtual tables, caches, remote sources, workload classes used to govern resource usage for the tenant's database objects, and database users. Advantageously, the lifecycle of a tenant may be decoupled from the lifecycle of its assigned database artifacts. However, in some embodiments, dropping of a tenant from a database instance results in dropping of artifacts assigned thereto, so long as those artifacts are not assigned to another tenant of the database instance.

A native multi-tenant database system may include one or more database instances, the data of all tenants, and the engines for processing the data. The single system also includes a single persistence for the data of all the tenants. By allowing multiple, independent tenants, or rather customers, to be hosted on a single instance and share computing resources, deployment of a new tenant to a database instance is associated with a near-zero marginal cost. The latter comes at a cost of lower physical isolation between the different tenants. Moreover, embodiments enable a pay-per-use model having a finer granularity than that required for provisioning a separate database instance.

A database system according to some embodiments supports requests for tenant-level database operations which would otherwise need to be implemented by the application. These operations may include tenant creation, tenant drop, tenant move, tenant restore from backup, tenant clone, tenant resize and tenant resource limitation. In some embodiments, a shared service exposes APIs (e.g., via REST) which are called by muti-tenant applications to request these tenant-level operations from the database system using, for example, an associated tenant id. Current database system DDLs may be extended to support the assignment of database artefacts to tenants.

FIG. 1 is a block diagram of system 100 according to some embodiments. The illustrated elements of system 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/ or any other metric.

Database instance 110 provides native multi-tenancy according to some embodiments. Database instance 110 may be provisioned on any suitable combination of hardware and software, including one or more computer servers or virtual machines. In some embodiments, database instance 110 comprises a containerized application executing within a software container. Such containers may be implemented by one or more nodes of a cluster (e.g., a Kubernetes cluster) as is known in the art.

Database instance 110 includes data engines 111 for processing data stored in volatile (e.g., Random Access) memory 112. Memory 112 includes data 113 which includes tables, schemas, and metadata of all tenants assigned to database instance 110. Data engines 111 may include a row store engine for processing row store tables stored in data 113 and a column store engine for processing columns of column store tables stored in data 113. As is known in the art, the data of each row of a row store table is stored in contiguous memory locations of memory 112, and the data of columns of column store tables is stored in contiguous memory locations of memory 112.

Each tenant of system 100 will be described as corresponding to a customer, where a customer may be a company, a division, a workgroup, or any other group of users. A tenant may correspond to a particular cloud resource/ service subscription of a given customer. In this regard, a customer may be associated with more than one subscription and therefore more than one tenant.

Data 113 includes multiple instances of a tenant object defined in the metadata. Each tenant instance is a collection of database artifacts, where the artifacts assigned to each tenant instance are stored within data 113. The database artifacts assigned to a tenant instance may include, for example, one or more schemas, tables, and partitions. The database artifacts may also include metadata defining views on the tenant's tables, virtual tables, caches, remote sources, workload classes used to govern resource usage for the tenant's database objects, and database users.

Data of a row store table is stored in data 113 as a set of linked logical pages. According to some embodiments, each page is 16 kB in size. As is known in the art, each page includes a header and a body. The header includes page metadata such as, for example, a logical page number and pointers to a preceding page and to a next logical page. The body includes actual data of the row store table which is associated with the page.

Multi-tenant application 130 may comprise a SaaS application but embodiments are not limited thereto. Multi-tenant application 130 may be provisioned on one or more computer servers or virtual machines and may comprise a containerized application executing within a software container. Multi-tenant application 130 issues queries (e.g., SQL, MDX) to database instance 110 based on input received from users 135 and 145 of customers 130 and 140, respectively.

It will be assumed that customer A 140 corresponds to a first tenant of database instance 110 and that customer B 140 corresponds a second tenant of database instance 110. Upon receipt of input from a user 145 of customer A 140, multi-tenant application 120 may transmit a query to database instance 110 which indicates an association with the first tenant. Similarly, upon receipt of input from a user 145 of customer B 150, multi-tenant application 120 may transmit a query to database instance 110 along with an indication that the query is associated with the second tenant.

Accordingly, multi-tenant application 120 is able to determine the tenant which corresponds to a user from whom input is received. For example, each user may logon to multi-tenant application 120 using a tenant-specific subscription. Multi-tenant application 120 therefore associates a user with the tenant of the subscription under which the user has logged on. In another example, communications between users and multi-tenant application 120 may include tenant-identifying tokens.

Multi-tenant application 120 is also aware of which tenants are placed on which database instances. In this regard, multi-tenant application 120 may request provisioning of database instances and creation of tenants on provisioned database instances. Upon receiving input from a user associated with a given tenant, multi-tenant application 120 is able to determine the database instance which includes the given tenant and to which a corresponding query should therefore be directed.

Upon receipt of a query from multi-tenant application 120, database instance 110 processes the query using data engines 111 and the artifacts (e.g., row store tables) which have been assigned to the particular tenant with which the query is associated. Each time a query received from an application consists of a transaction on data in memory 112, the transaction is logged as a log entry of a log segment stored within data 113. The pre-transaction version of the data page is stored as an undo data page, and the data page as changed by the transaction is marked as "dirty". Periodically, and as is known in the art, a savepoint is created by writing the dirty data pages and the corresponding undo data pages of data 113 to persistent storage 120.

Persistent storage 120 persists encrypted data of all assigned tenants. Persistent storage 120 may be implemented using any persistent data storage system that is or becomes known, including but not limited to distributed data storage systems. Persistent storage 120 includes data volume 122 and log volume 124.

According to some embodiments, the header of each page associated with a row store table includes an identifier which can be used to determine an encryption key pair. As used herein, an encryption key pair may include an encryption key and its associated decryption key or a single asymmetric key used for encryption and decryption. The encryption key pair may be stored among encryption keys 165 of local storage 160. At a savepoint, and for each dirty and undo data page stored in memory 112, page management component 114 acquires the identifier in the header of the data page, determines an encryption key pair of encryption keys 165 based on the identifier, and uses the encryption key of the key pair to encrypt the body of the data page. Page management component 114 then stores the data page including the unencrypted header and the encrypted body within data volume 122 of persistent storage 120.

In some cases, the data page to be stored is not associated with any particular tenant and the identifier of its header indicates the data page is unassigned. To encrypt such a data page, page management component 114 determines an encryption key pair of encryption keys 165 which is associated with database instance 110, rather than with any specific tenant, and uses the encryption key of this key pair to encrypt the body of the unassigned data page prior to storage within data volume 122. Accordingly, data volume 122 includes encrypted data pages and undo data pages of row store tables which are assigned to particular tenants and of row store tables which are not assigned to any particular tenant of database instance 110.

The encryption key pair associated with a given tenant may be generated and stored in store 160 upon creation of the given tenant. Similarly, the encryption key pair associated with database instance 110 may be generated at creation of database instance 110.

Logger component 115 writes a log entry to log volume 124 for each committed transaction. Such a log entry is referred to as a redo log entry and is associated with a transaction on one row store table. A redo log entry may include header information such as a start time of the transaction and an indicator of whether the transaction was committed or aborted, and also includes the updated table data resulting from the transaction.

Each log entry may also include an identifier which can be used to determine an encryption key pair of encryption keys 165. Each time logger 115 is to save a log entry in log volume 124 logger 115 acquires the identifier of the log entry, determines an encryption key pair of encryption keys 165 based on the identifier, and uses the encryption key of the key pair to encrypt the updated table data of the log entry. Logger 115 then stores the log entry including the unencrypted header information and the encrypted updated table data within log volume 124.

At a restart of database instance 110, page management component 114 reads the row store table data pages of the latest savepoint from data volume 122 and loads the data pages into memory 112. Since the body of each data page is stored in data volume 122 in encrypted format, it is necessary to decrypt the body of each data page prior to loading the data pages to memory 112. Accordingly, for each stored data page of the savepoint, page management component 114 uses the identifier in the header of the data page to identify a decryption key of keys 165 and uses the decryption key to decrypt the body of the data page. The header and the decrypted body are then loaded into memory 112.

Next, the undo data pages stored in data volume 122 at the last savepoint and associated with uncommitted transactions are identified. Page management component 114 uses the identifier in the header of each undo data page to identify a corresponding decryption key and uses the decryption key to decrypt the body of the undo data page. The decrypted undo data pages are then provided to a rollback mechanism of database instance 110 to roll back the uncommitted transactions to the states represented by the decrypted undo data pages within data 113.

Logger 115 searches log volume 124 for log entries associated with transactions committed since the last savepoint. For each identified log entry, logger 115 uses the identifier of the log entry header information to identify a decryption key of keys 165 and uses the decryption key to decrypt the data of the log entry. The header information and the decrypted data are then provided to a log replay mechanism to update data 113 based on the decrypted data.

Database instance 110 thereby provides a single data server including the data and metadata of all tenants of database instance 110, the engines for processing the data, and a single persistence for the data and metadata. Hosting multiple independent tenants on such a single database instance facilitates sharing of computing resources at near-zero marginal cost.

FIG. 2A is a conceptual illustration of unencrypted data page 200 according to some embodiments. Data page 200 may be stored in memory 112 and may comprise a data page of row store table data. Data page 200 is associated with a logical page number as is known in the art. Data page 200 may comprise an undo data page as described above. Data page 200 includes header 210 and body 220, with body 220 storing actual table data and header 210 storing metadata associated with the data of body 220.

Header 210 includes key-identifying header portion 212. Header portion 212 may store any information suitable for determining an encryption key pair which should be used to encrypt and decrypt the data of body 220. The information may comprise an identifier of a tenant (which in turn is associated with an encryption key pair by the metadata of database instance 110), of the key pair itself, or of another entity having a 1-to-1 relationship with the key pair. In some embodiments, header portion 212 stores an eight byte value.

Upon creation of a row store table within data 113, the key-identifying header portion 212 may be populated with an identifier of a database-specific key pair associated with database instance 110. If the row store table is then assigned to a tenant, the value of the identifier is updated to an identifier of the tenant (or of the key pair created for the tenant, for example). In some embodiments, a row store table is assigned to a tenant at its creation, in which case header portion 212 is initially populated with the identifier of the tenant (or associated key pair).

FIG. 2B is a conceptual illustration of encrypted data page 230 according to some embodiments. Encrypted data page 230 is an encrypted version of page 200 of FIG. 2A and represents the same logical page number as page 200. For example, in order to store data page 200 in persistent storage, body 220 is encrypted using an encryption key identified by an identifier within header portion 212, resulting in body 240. Similarly, prior to loading stored data page 230 into memory, body 240 is decrypted using a decryption key identified by an identifier within header portion 212 of page 230, resulting in body 220. Advantageously, header 210 including the key identifier is never encrypted and can always be read in order to determine the key pair associated with data pages 200 and 230.

FIG. 3A illustrates unencrypted redo log entries 300 according to some embodiments. Redo log entries 300 may comprise a log segment stored in memory 112 during operation of database instance 110 as is known in the art. In this regard, all data changes are recorded in log segments in a redo log buffer of memory 112.

Each redo log entry includes a header 310 and redo log data 320 which describes a data change to a database table caused by a transaction. Each header 310 includes a key-identifying header portion 312 storing an identifier (e.g., an identifier of a tenant to which the database table is assigned). The identifier is usable to identify an encryption key pair for use in encrypting and decrypting the redo log data 320.

When a database transaction is committed, its corresponding redo log entries are saved to persistent storage. The log segments of the redo log buffer may also be persisted once the redo log buffer reaches a certain size, regardless of whether or not a transaction has been committed. Redo log entries are encrypted prior to storage in persistent storage.

FIG. 3B is a conceptual illustration of encrypted redo log entries 330 including a key-identifying header portion according to some embodiments. Encrypted log entries 330 comprise encrypted versions of log entries 300 of FIG. 3A.

In order to store log entries 300 in persistent storage, each redo log data portion 320 is encrypted using an encryption key identified by an identifier within its corresponding header portion 312, resulting in encrypted redo log data 340. At database restart, prior to passing the stored encrypted log entries to a replay mechanism of database instance 110, the encrypted redo log data 340 is decrypted using a decryption key identified by an identifier within corresponding header portions 312, resulting in decrypted data 320. Again, since header 310 of each log entry is never encrypted, portion 312 can always be read in order to determine the key pair to be used for encryption and decryption of a given redo log entry.

Figure 4:
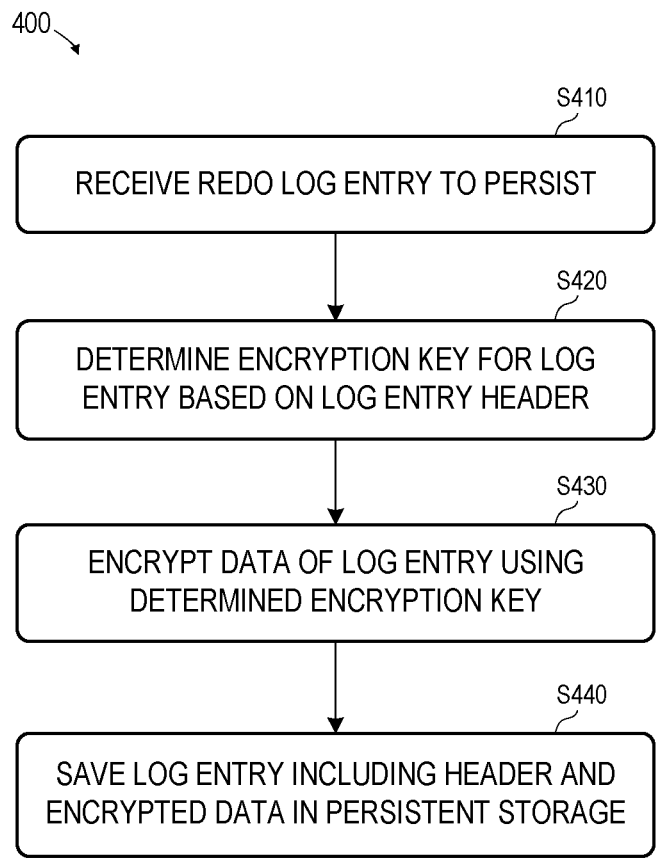
FIG. 4 is a flow diagram of a process to encrypt and store a redo log entry according to some embodiments.

FIG. 4 is a flow diagram of a process to encrypt and store a tenant-specific log entry according to some embodiments. Process 400 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S410, a redo log entry to be persisted is received. The log entry may be received by a logger of a database instance such as logger 115. Logger 115 may also execute the remaining steps of process 400, but embodiments are not limited thereto. The log entry may correspond to a committed transaction as mentioned above, or may be received along with other log entries of a log buffer due to flushing of the log buffer.

An encryption key is determined for the log entry at S420 based on a header of the log entry. As described above, each redo log entry may include a header portion storing an identifier usable to determine an encryption key pair. The identifier may identify a database tenant or may indicate that the database table associated with the log entry is not assigned to any database tenant. In the former case, an encryption key associated with the database tenant is determined at S420. In the latter case, an encryption key associated with the database instance and not with any particular tenant is determined at S420.

Data of the log entry is encrypted using the determined encryption key at S430. The data consists of the data of the committed transaction which is associated with the redo log entry. The header is not encrypted, so that the identifier within the header can be read from persistent storage and used to decrypt the data at a later time. In this regard, the log entry is saved in persistent storage at S440. The saved log entry consists of the header as received at S410 and the data encrypted at S430.

Figure 5:
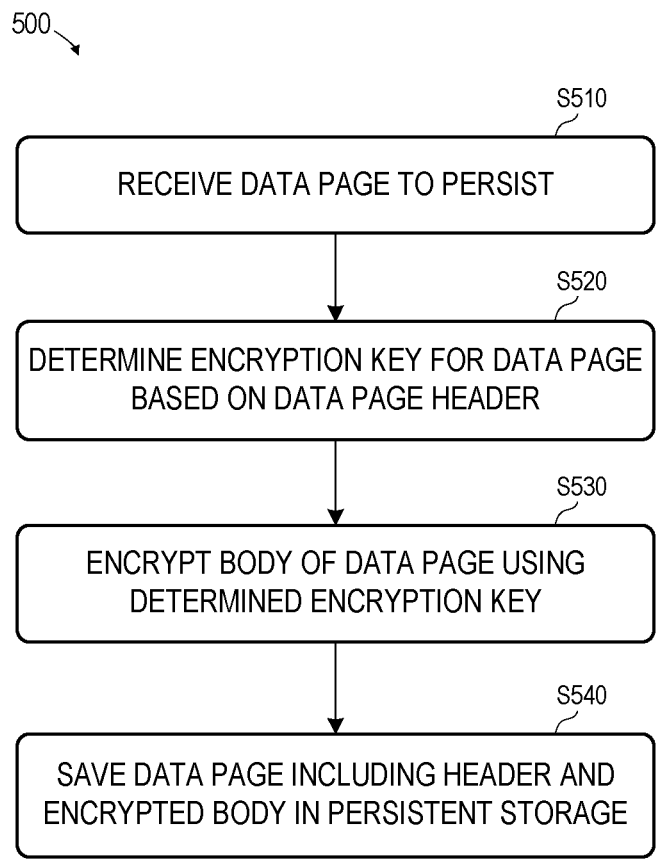
FIG. 5 is a flow diagram of a process to encrypt and store a data page according to some embodiments.

FIG. 5 is a flow diagram of a process to encrypt and store a data page of a row store table according to some embodiments. A data page to persist is received at S510. The data page may be received by page management component 114 during a process for creating a savepoint. In this regard, the received data page may comprise a data page which was changed since a last savepoint or an undo data page.

An encryption key is determined for the data page is determined at S520 based on a header of the data page. The determination at S520 may consist of accessing a portion of the header to locate an identifier stored therein, and determining an encryption key pair based on the identifier. For example, the identifier may identify a database tenant assigned to the row store table associated with the data page. Alternatively, the identifier may indicate that the row store table is not assigned to any database tenant. Accordingly, based on the identifier, an encryption key associated with a database tenant or with the database instance is determined at S520.

A body of the data page, consisting of row store table data, is encrypted at S530 using the determined encryption key. The header of the data page is not encrypted, so that the identifier within the header can be read from persistent storage and used to decrypt the body when needed. The data page, including the header and the encrypted body, is saved in persistent storage at S540.

Figure 6A:
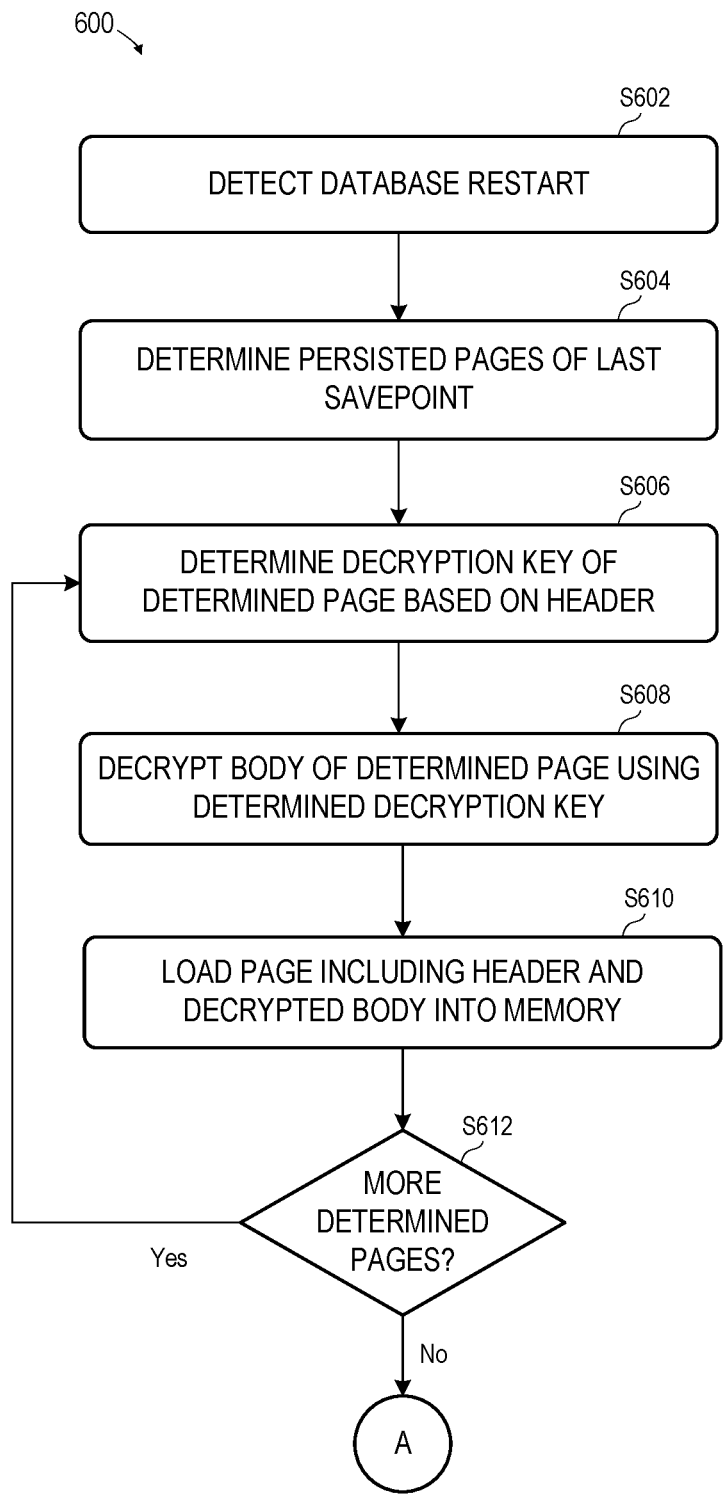
FIGS. 6A through 6C depict a flow diagram of a process to decrypt data pages, redo log entries and undo pages during a database restart according to some embodiments.
Figure 6B:
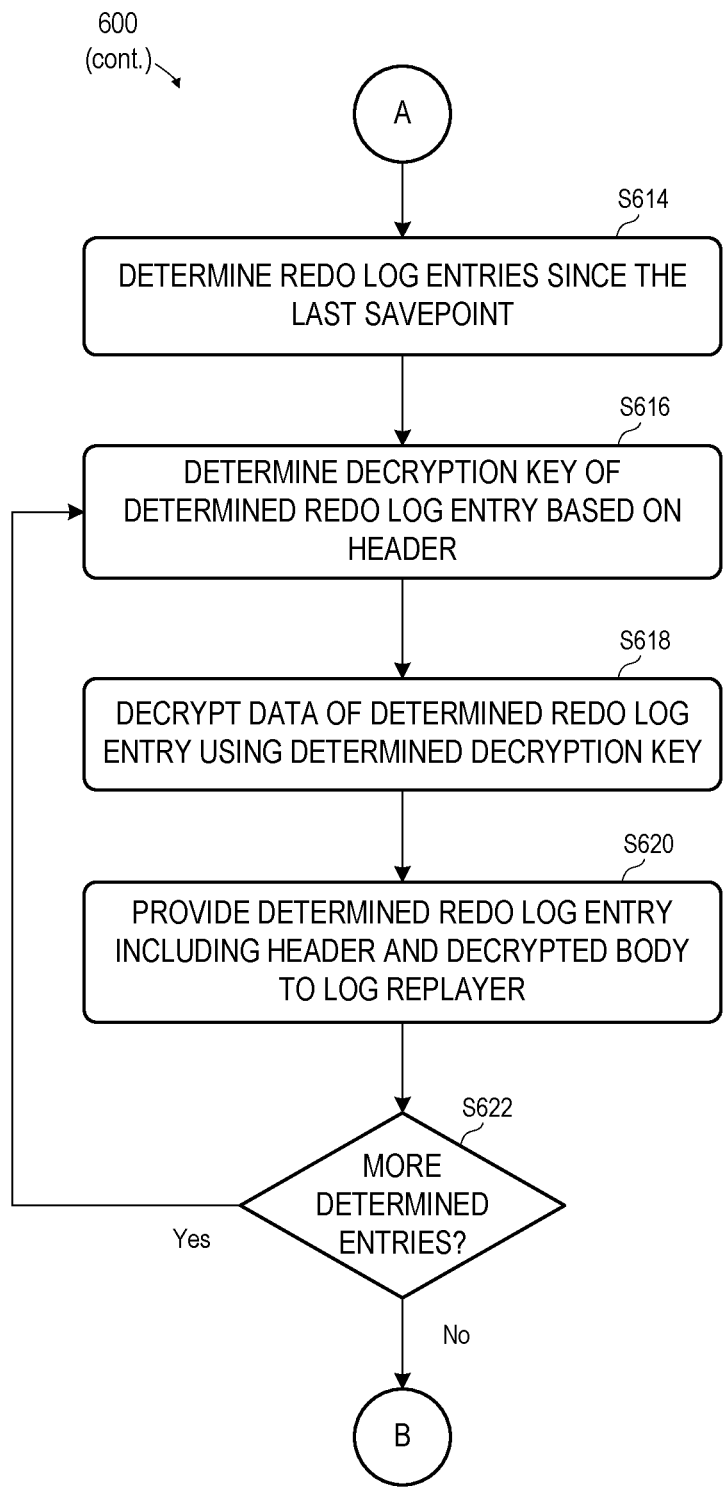
Figure 6C:
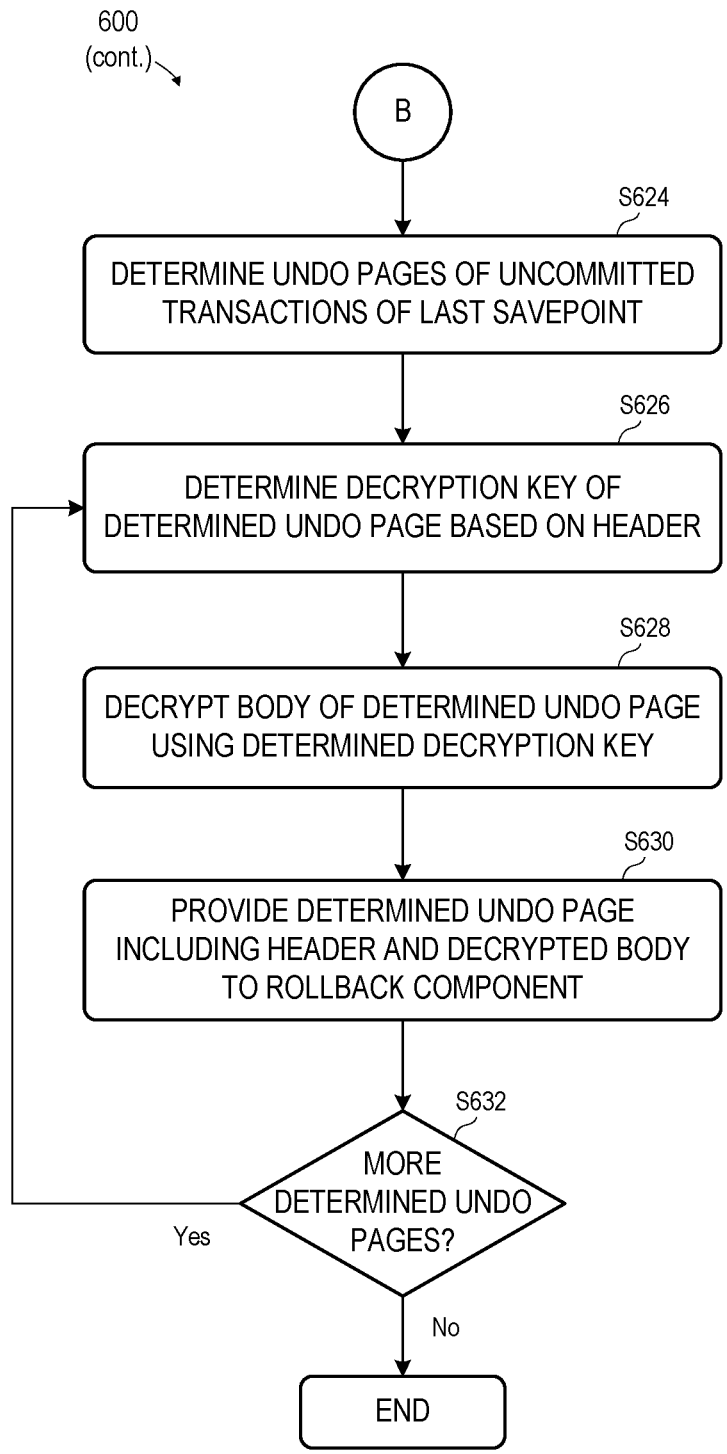

FIGS. 6A through 6C depict a flow diagram of a process to decrypt data pages, redo log entries and undo pages during a database restart according to some embodiments. A database restart is detected at S602 and, in response, the persisted pages of a last savepoint are determined at S604. In some embodiments, page management component 114 determines the row store table data pages of the last savepoint from data volume 122 at S604. Since the body of each data page is stored in data volume 122 in encrypted format, it is necessary to decrypt the body of each data page prior to loading the data pages to memory 112.

Accordingly, a decryption key for one of the determined data pages is determined at S606. Page management component 114 may use an identifier in the header of the data page to identify a decryption key of keys 165 at S606 as described above. The body of the data page is decrypted at S608 using the determined decryption key to decrypt the body of the data page. Next, at S610, the data page including the header and the decrypted body are loaded into memory 112.

Flow returns from S612 to S606 if other determined data pages remain to be decrypted and loaded into memory. Accordingly, flow cycles among S606 through S612 until all the determined data pages have been decrypted and loaded into memory. Embodiments are not limited to serially decrypting and loading each data page as described above. For example, a batch of data pages (e.g., data pages to be decrypted using a same decryption key) may be decrypted in a first step and then loaded into memory in a next step. Flow proceeds to S614 after all the determined data pages have been decrypted and loaded into memory.

At S614, logger 115 may search log volume 124 to determine redo log entries associated with transactions committed since the last savepoint. For a determined log entry, logger 115 uses an identifier stored within the log entry header information to determine a decryption key of keys 165. The determined decryption key is used to decrypt the data of the log entry at S618. Next, the header and the decrypted data are provided to a redo log replay mechanism of database instance 110 to update data 113 based on the decrypted redo log entry data.

Flow returns from S622 to S616 if other redo log entries determined at S614 remain to be decrypted and loaded into memory. Flow therefore cycles between S616 through S622 until all the determined redo log entries have been decrypted and provided to the log replayer. Embodiments are not limited to serially decrypting and providing each determined redo log entry, rather, the redo log entries may be batch-processed.

Once all the determined redo log entries have been decrypted and provided to the log replayer, the undo data pages stored in data volume 122 at the last savepoint and associated with uncommitted transactions are determined at S624. Page management component 114 may use the identifier in the header of a determined undo data page to identify a corresponding decryption key at S626. The body of the undo data page is then decrypted using the decryption key at S628. Next, at S630, the decrypted undo data page including the header and the decrypted body are provided to a rollback mechanism of database instance 110 to roll back uncommitted transactions reflected in data 113 to the state represented by the decrypted undo data page.

Flow returns S626 if other determined undo data pages remain to be processed. Flow therefore cycles between S626 through S632 until all the determined undo data pages have been decrypted and provided to the rollback mechanism. Again, a plurality of determined undo data pages may be batch-processed at S626, S628 and/or S630.

Figure 7:
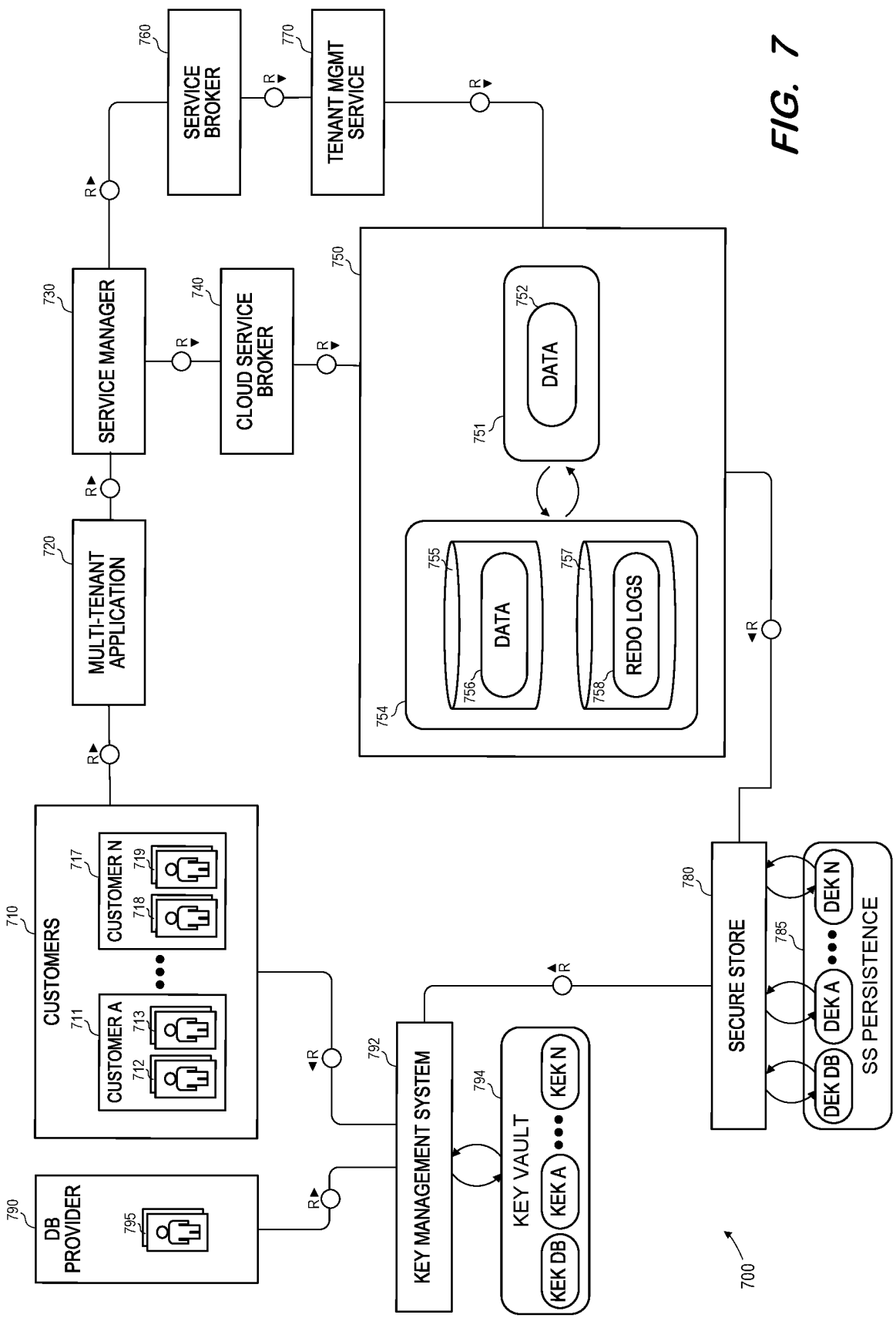
FIG. 7 is a block diagram of a database system providing native multi-tenancy and tenant-level encryption according to some embodiments.

FIG. 7 is a block diagram of a database system providing native multi-tenancy and tenant-level encryption according to some embodiments. Database instance 750 stores data 752 within volatile memory 751 as described above with respect to data 113 and memory 112. The data engines of database instance 750 have been omitted from FIG. 7 for clarity.

Each tenant instance of database instance 750 corresponds to a respective one of customers 710. Customer A 711 includes key users 712 and business users 713, and customer N 717 includes key users 718 and business users 719. In some examples, a key user 712 may access multi-tenant application 720 to request provisioning of a database instance. This request is forwarded to service manager 730 and to cloud service broker 740. Cloud service broker 740 then provisions database instance 750 as a cloud-based resource.

A tenant object instance may then be created in the database instance. Continuing the above example, a key user 712 may access multi-tenant application 720 to request creation of a tenant on database instance 750. This request is forwarded to service manager 730, to service broker 760, and to tenant management service 770. Tenant management service 770 then instructs database instance 750 to create an instance of tenant A based on a tenant object defined in metadata of data 752. The instance of tenant A may be identified by a tenant ID which is known to database instance 750 and multi-tenant application 720.

Some embodiments may use a deployment infrastructure to define database artifacts to assign to a tenant instance. The deployment infrastructure may provide a declarative approach for defining database objects (e.g., as design-time artifacts) using containers. For example, service broker 760 may create a container which corresponds to a database schema and additional metadata (e.g., user, roles, privileges) which may then be assigned to a tenant instance. Such containers may be isolated from each other by schema-level access privileges. Application 720 can access any database object in the database schema of the container by using an assigned per-schema technical database user.

After provisioning database instance 750 and creating tenants A and N, multi-tenant application 720 may, for example, receive input from a business user 713 of customer A 711. In response, application 720 directs any resulting queries to database instance 750 via tenant management service 770 along with an identifier of tenant A. Database instance 750 therefore responds to the queries based on artifacts assigned to tenant instance A. In a case that multi-tenant application 720 receives input from a business user 719 of customer N 717, any resulting queries are directed to database instance 750 and responded to based on artifacts assigned to tenant instance N.

Persistence 754 may be implemented using any suitable storage system or systems. Data volume 755 of persistence 754 stores data 756 of all database objects which are assigned to a tenant and those which are not assigned to a particular tenant. Log volume 757 stores redo logs 758 corresponding to committed transactions related to all database objects. As described above, data 756 and redo logs 758 are encrypted. Specifically, and in contrast to prior systems, tenant-specific data 756 and redo logs 758 are encrypted using data encryption keys (DEKs) which are specific to their corresponding tenant (e.g., DEK A and DEK N), and data 756 and redo logs 758 which are not specific to any tenant are encrypted using a DEK which is specific to database instance 750 (e.g., DEK DB).

According to some embodiments, DEK DB is a public-private key pair generated during creation of database instance 750 and tenant-specific keys DEK A and DEK N are public-private key pairs generated during creation of tenants A and N, respectively. The public key of a key pair is used to encrypt data 752 and redo logs prior to storage in persistence 754, and the private key is used to decrypt stored data 756 and logs 758.

In some embodiments, the private keys (i.e., the decryption keys) of the key pairs are stored in persistence 785 of secure store 780 in encrypted form. For example, a key user 795 of database instance provider 790 provides key encryption key (KEK) DB to key management system 792 for storage in key vault 794. KEK DB is used to encrypt the private key of DEK DB prior to storage thereof in secure store persistence 785. KEK DB may also comprise a private-public key pair, in which key vault 794 stores the private key of KEK DB while the corresponding public key is used to encrypt the private key of DEK DB prior to storage thereof in secure store persistence 785.

Accordingly, database instance 750 requests the private key of DEK DB from secure store 780 when database instance 750 wishes to decrypt tenant-unassigned data pages or redo logs. In response, secure store 780 requests key management system 792 to decrypt the stored encrypted private key of DEK DB using the private key of KEK DB. Database instance 750 then uses the decrypted private key of DEK DB to decrypt the desired decrypt tenant-unassigned data pages or redo logs.

Similarly, a key user 712 of customer A 711 provides KEK A to key management system 792 for storage in key vault 794. KEK A is used to encrypt the private key of DEK A prior to storage thereof in secure store persistence 785. KEK A may comprise a private-public key pair, in which key vault 794 stores the private key of KEK A while the corresponding public key is used to encrypt the private key of DEK A prior to storage thereof in secure store persistence 784.

Database instance 750 may request the private key of DEK A from secure store 780 in order to decrypt data pages of data 756 or redo logs of logs 758 which are associated with tenant A. In one example, the headers of such data pages or redo logs include an identifier identifying tenant A, and database instance 750 is aware that tenant A is associated with DEK A. In response to the request, secure store 780 requests key management system 792 to decrypt the stored encrypted private key of DEK A using the private key of KEK A. The request may be issued to an account of key management system 792 which is specific to customer A 711. Database instance 750 then uses the decrypted private key of DEK A to decrypt the desired data of data 756 or logs of logs 758. Accordingly, if customer A revokes KEK A from key vault 794, key management system 792 cannot decrypt stored private key DEK A and, consequently, database instance 750 cannot decrypt data or redo logs which are specific to tenant A.

Figure 8:
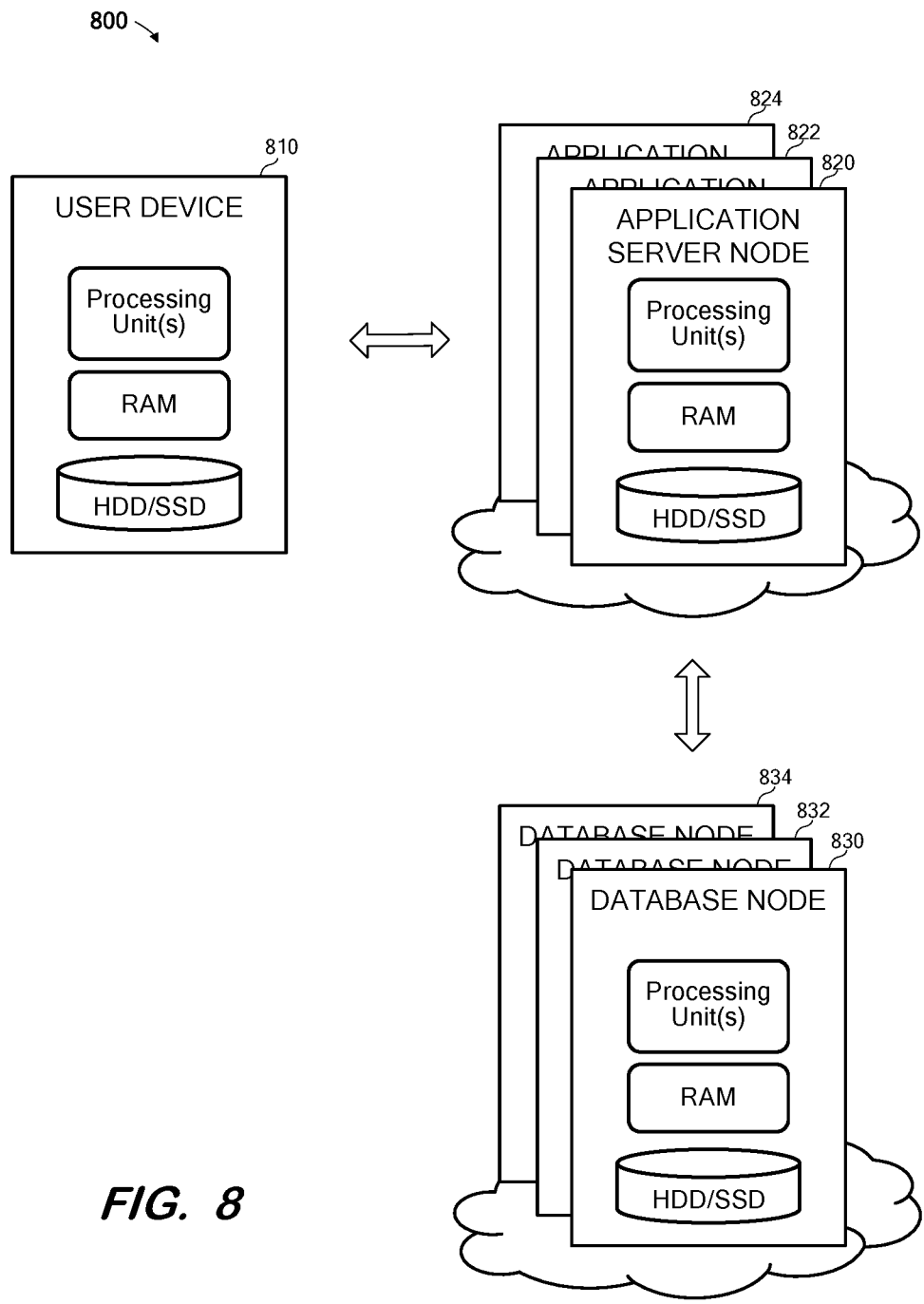
FIG. 8 is a block diagram of a cloud-based system according to some embodiments.

FIG. 8 is a block diagram of cloud-based database deployment 800 according to some embodiments. User device 810 may comprise any suitable computing system operable by a key user or a business user to access a cloud-based multi-tenant application. User device 810 may store and execute program code of a Web browser to access a Uniform Resource Locator (URL) associated with a login page of such a multi-tenant application. The Web browser may download and execute program code of a client-side component of a multi-tenant application as is known in the art.

Application server nodes 820, 822 and 824 may host a multi-tenant application according to some embodiments. Database nodes 830, 832 and 834 may host one or more database instances accessible to the multi-tenant application and which provide native multi-tenancy as described herein. Database nodes 830, 832 and 834 may encrypt data pages and redo logs using tenant-specific encryption keys and store the encrypted data pages and redo logs in persistent storage, and may decrypt thusly-stored data pages and redo logs using tenant-specific decryption keys as described herein.

Each node of deployment 800 may comprise a separate physical machine or a virtual machine. Such virtual machines may be allocated by a cloud provider providing self-service and immediate provisioning, autoscaling, security, compliance and identity management features.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:
1. A database system comprising:
a persistent storage system;
a volatile memory storing a plurality of data pages of a row store database table; and
a processing unit to execute program code of a database instance to cause the database system to:

determine a first encryption key associated with a data page of the plurality of data pages based on a header of the one of the plurality of data pages;

encrypt a body of the one of the plurality of data pages using the first encryption key;

store an encrypted data page comprising a data page header indicating the first encryption key and the encrypted body in the persistent storage system at a savepoint, at which changed data pages and undo pages representing immediately prior versions of the changed data pages are written to the persistent storage system;

after storing the encrypted data page, commit a transaction on the data page;

determine a redo log entry associated with the committed transaction and describing data of the data page resulting from the committed transaction;

encrypt the data of the redo log entry using a second encryption key;

store an encrypted redo log entry page comprising a redo log entry header indicating the second encryption key and the encrypted redo log entry data in the persistent storage system; and receive an instruction to recover the row store database to the savepoint and from a crash which occurred prior to storing the data page resulting from the committed transaction in the persistent storage and, in response to the instruction:

determine the first decryption key based on the data page header of the encrypted data page stored in the persistent storage system;

decrypt the encrypted body of the encrypted data page stored in the persistent storage system using the first decryption key;

save the decrypted body to the volatile memory;

determine the second decryption key based on the redo log entry header of the encrypted redo log entry page stored in the persistent storage system;

decrypt the encrypted redo log entry data of the encrypted redo log entry page stored in the persistent storage system using the second decryption key; and modify the decrypted body of the data page saved to volatile memory based on the decrypted redo log entry data.

2. A system according to claim 1, wherein the volatile memory stores a plurality of undo data pages, and wherein the processing unit is to execute program code of the database instance to cause the database system to, at the savepoint:

determine a third encryption key associated with one of the plurality of undo data pages based on an undo page header of the one of the plurality of undo data pages;

encrypt an undo page body of the one of the plurality of undo data pages using the third encryption key; and store an undo data page comprising the undo page header and the encrypted undo page body in the persistent storage system.

3. A system according to claim 2, wherein the processing unit is to execute program code of the database instance to cause the database system to, in response to the instruction:

determine the undo data page stored in the persistent storage system is associated with an uncommitted transaction;

determine the third decryption key based on the header of the undo data page stored in the persistent storage system;

decrypt the encrypted body of the undo data page stored in the persistent storage system using the third decryption key; and roll back the uncommitted transaction based on the decrypted body of the undo data page.

4. A system according to claim 3, wherein the decryption key, the second decryption key and the third decryption key are different from one another, and wherein the processing unit is to execute program code of the database instance to cause the database system to:

request decryption of the decryption key, the second decryption key and the third decryption key from a key management system.

5. A method comprising:

determining a first encryption key associated with a data page of a row store database table stored in a volatile memory, based on a header of the data page;

encrypting a body of the data page using the first encryption key;

storing an encrypted data page comprising the a data page header indicating the first encryption key and the encrypted body in a persistent storage system at a savepoint, at which changed data pages and undo pages representing immediately prior versions of the changed data pages are written to the persistent storage system;

after storing the encrypted data page, committing a transaction on the data page;

determining a redo log entry associated with the committed transaction and describing data of the data page resulting from the committed transaction;

encrypting the data of the redo log entry using a second encryption key:

storing an encrypted redo log entry page comprising a redo log entry header indicating the second encryption key and the encrypted redo log entry data in the persistent storage system; and receiving an instruction to recover the row store database to the savepoint and from a crash which occurred prior to storing the data page resulting from the committed transaction in the persistent storage and, in response to the instruction:

determining the first decryption key based on the data page header of the encrypted data page stored in the persistent storage system;

decrypting the encrypted body of the encrypted data page stored in the persistent storage system using the first decryption key;

saving the decrypted body to the volatile memory;

determining the second decryption key based on the redo log entry header of the encrypted redo log entry page stored in the persistent storage system;

decrypting the encrypted redo log entry data of the encrypted redo log entry page stored in the persistent storage system using the second decryption key; and modifying the decrypted body of the data page saved to volatile memory based on the decrypted redo log entry data.

6. A method according to claim 5, further comprising:

at the savepoint:

determining a third encryption key associated with an undo data page stored in the volatile memory, based on an undo page header of the undo data page;

encrypting an undo page body of the undo data page using the third encryption key; and storing an encrypted undo data page comprising the undo page header and the encrypted undo page body in the persistent storage system.

7. A method according to claim 6, further comprising:
in response to the instruction:
  determining the encrypted undo data page stored in the persistent storage system is associated with an uncommitted transaction;
  determining the third decryption key based on the header of the encrypted undo data page stored in the persistent storage system;
  decrypting the encrypted body of the encrypted undo data page stored in the persistent storage system using the third decryption key; and
  rolling back the uncommitted transaction based on the decrypted body of the undo data page.

8. A method according to claim 7, wherein the decryption key, the second decryption key and the third decryption key are different from one another, and further comprising:
  requesting decryption of the decryption key, the second decryption key and the third decryption key from a key management system.

9. A non-transitory computer-readable medium storing program code executable by one or more processing units to cause a computing system to:
  determine a first encryption key associated with a data page of a row store database table stored in a volatile memory, based on a header of the data page;
  encrypt a body of the data page using the first encryption key; and
  store an encrypted data page comprising a data page header indicating the first encryption key and the encrypted body in a persistent storage system at a savepoint, at which changed data pages and undo pages representing immediately prior versions of the changed data pages are written to the persistent storage system;
  after storing the encrypted data page, commit a transaction on the data page;
  determine a redo log entry associated with the committed transaction and describing data of the data page resulting from the committed transaction;
  encrypt the data of the redo log entry using a second encryption key:
  store an encrypted redo log entry page comprising a redo log entry header indicating the second encryption key and the encrypted redo log entry data in the persistent storage system; and
  receive an instruction to recover the row store database to the savepoint and from a crash which occurred prior to storing the data page resulting from the committed transaction in the persistent storage and, in response to the instruction:
    determine the first decryption key based on the data page header of the encrypted data page stored in the persistent storage system;
    decrypt the encrypted body of the encrypted data page stored in the persistent storage system using the first decryption key;
    save the decrypted body to the volatile memory;
    determine the second decryption key based on the redo log entry header of the encrypted redo log entry page stored in the persistent storage system;
    decrypt the encrypted redo log entry data of the encrypted redo log entry page stored in the persistent storage system using the second decryption key; and
    modify the decrypted body of the data page saved to volatile memory based on the decrypted redo log entry data.

10. A medium according to claim 9, the program code executable by one or more processing units to cause a computing system to, at the savepoint:
  determine a third encryption key associated with an undo data page stored in the volatile memory, based on an undo page header of the undo data page;
  encrypt an undo page body of the undo data page using the third encryption key; and
  store an encrypted undo data page comprising the undo page header and the encrypted undo page body in the persistent storage system.

11. A medium according to claim 10, the program code executable by one or more processing units to cause a computing system to, in response to the instruction:
  determine the encrypted undo data page stored in the persistent storage system is associated with an uncommitted transaction;
  determine the third decryption key based on the header of the encrypted undo data page stored in the persistent storage system;
  decrypt the encrypted body of the encrypted undo data page stored in the persistent storage system using the third decryption key; and
  roll back the uncommitted transaction based on the decrypted body of the undo data page.

12. A medium according to claim 11, wherein the decryption key, the second decryption key and the third decryption key are different from one another, the program code executable by one or more processing units to cause a computing system to:
  request decryption of the decryption key, the second decryption key and the third decryption key from a key management system.

* * * * *